(No Model.)
J. H. MILLER & W. H. BURNHAM.
WINDMILL BRAKE.
No. 490,295. Patented Jan. 24, 1893.
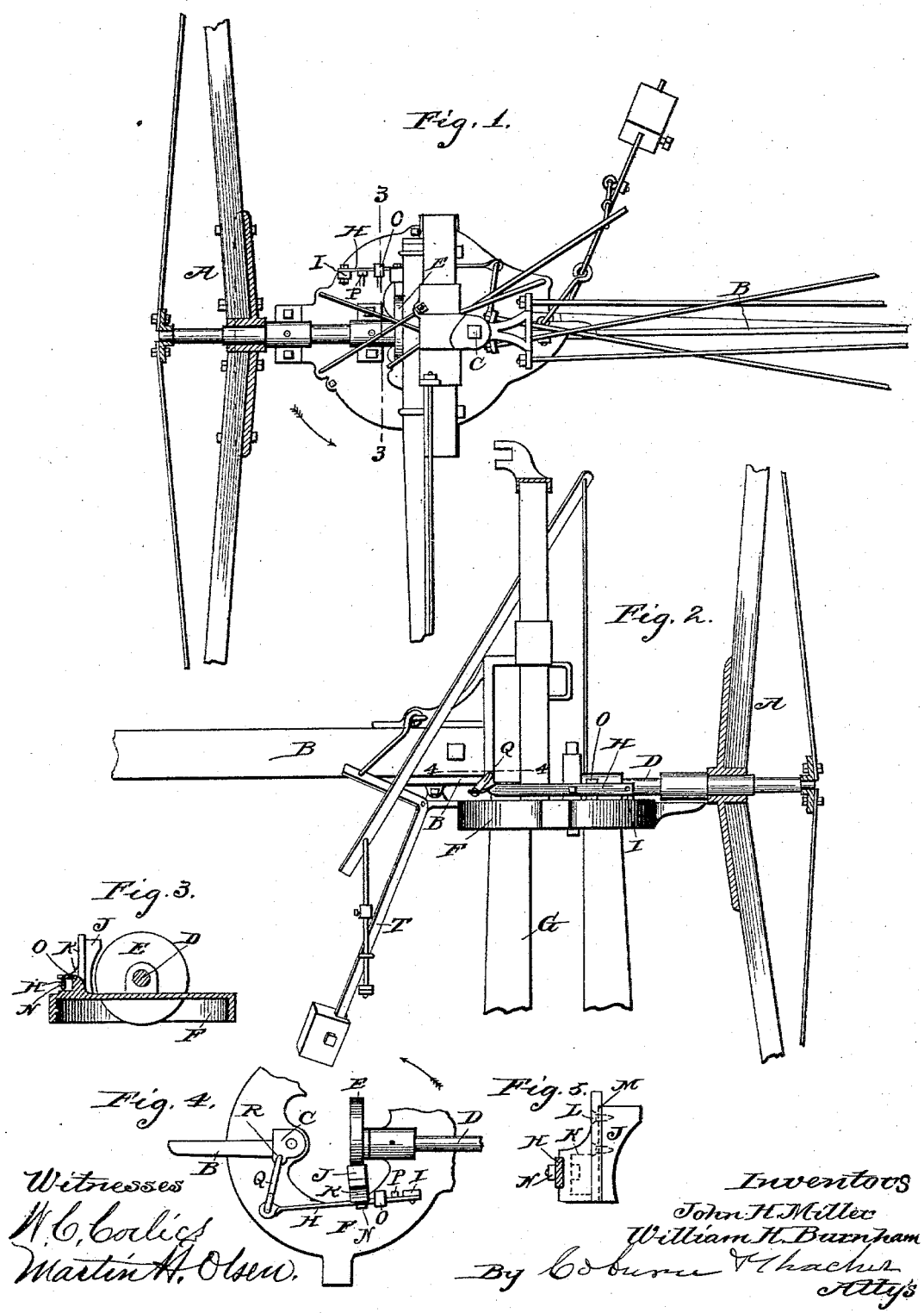
Witnesses
W. C. Corliss
Martin H. Olsen
Inventors
John H. Miller
William H. Burnham
By Coburn & Thacher
Atty's

United States Patent Office.

JOHN H. MILLER AND WILLIAM H. BURNHAM, OF BATAVIA, ILLINOIS, ASSIGNORS TO THE UNITED STATES WIND ENGINE AND PUMP COMPANY, OF SAME PLACE.

WINDMILL-BRAKE.

SPECIFICATION forming part of Letters Patent No. 490,295, dated January 24, 1893.

Application filed June 27, 1891. Serial No. 397,690. (No model.)

*To all whom it may concern:*

Be it known that we, JOHN H. MILLER and WILLIAM H. BURNHAM, citizens of the United States, residing at Batavia, in the county of Kane and State of Illinois, have invented a certain new and useful Improvement in Windmill-Brakes, which is fully set forth in the following specification, reference being had to the accompanying drawings, in which—

Figure 1 represents a top plan view of a wind mill with our improvement attached. Fig. 2, a side elevation of the top portion of the mill, with the hinged vane portion cut away. Fig. 3 represents a vertical section of the turn-table, taken at the line 3—3, Fig. 1. Fig. 4 represents a top view of a portion of the turn-table and hinged vane and wind wheel shaft, looking down from the line 4—4, Fig. 2. Fig. 5 is a side elevation of the brake shoe and its attachment, with the brake lever cut in section.

The object of our invention is to make a wind mill having a spring lever which serves the purpose of carrying the brake, and at the same time serves as a spring to hold the wind wheel in wind; said spring lever being applied in a hinged vane solid wheel wind mill in such manner that when the wheel is swung around out of wind nearly or quite parallel with the vane, the brake will be applied to the crank-plate wheel and prevent the wind wheel from turning; and the spring lever which carries the brake will have tension sufficient to hold the wind wheel in wind, taking the place in that respect to what is known as a "weight of varying resistance," acting to bring the wind wheel into wind when thrown out, and hold it in wind to a certain extent, the tension of the spring increasing as the wind wheel is thrown out of wind. This is important in this class of wind mills, because if the mill continues to turn when turned out of wind, the water is caused to stand in the pump and freeze in the winter, or the tank is caused to run over and make it wet and muddy around the mill in summer, or icy in winter, and it is also important that the wind wheel in this class of mills is held face to wind until the wind becomes violent, when the wheel should swing around out of wind, so as not to be injured but be brought back into wind when the wind subsides. Our spring lever brake accomplishes both of these desirable results.

Our invention consists in the construction and application of this spring lever applied so as to carry the brake, and also act to hold the wind wheel in wind and bring it back to wind.

Our wind wheel, and tower, and turn-table, and hinged tail vane are constructed in any of the well known ways of constructing solid wheel hinged tail vane wind mills.

In the accompanying drawings, A represents the wind wheel. B, the hinged tail vane, which is hinged to the turn-table, at C, in the usual manner.

D is the wind wheel shaft. E, the crank-plate wheel.

F is the turn table which is supported upon the wind mill tower, at G, in any of the well-known ways.

H is an elastic or spring brake lever, one end of which is rigidly attached to the turn-table, as shown at I.

J is a wooden brake-shoe, which is secured to the brake-shoe block, K, by means of the screws, L. The wooden brake-shoe J sets in a groove, M, in the brake-shoe block K. The brake-shoe block K is secured to the brake-lever, H, by means of a bolt and a nut, N, as clearly shown in Fig. 5.

O is a brake-lever guide, having an open slot on one side in which the brake lever can vibrate horizontally, but not vertically.

P is a stop which is rigidly attached to the turn-table, and against which the brake-lever strikes, as the wind wheel is turned out of wind.

Q is a link or rod which connects the free end of the brake-lever H to the tail vane hinge iron, R. This link or rod Q has a hinge or pivotal connection to the vane hinge iron, as well as to the end of the brake lever.

In this class of wind mills the tail vane stands always in line with the wind. The wind wheel shaft has bearings on the turn-table and is in such a relative position to the tail vane, that the wind will cause the wind wheel to swing around laterally in the direction indicated by the arrows; and there is also attached to the turn-table a rod or chain extending nearly to the ground, so that when it is desired to swing the wind wheel around out of the wind, a person, by pulling on the rod or chain, can swing the wind wheel around out of wind by turning the turn-table in the direction indicated. The spring lever H, having one end attached to the turn-table and the other end connected with or attached to the tail vane, acts to hold the wind wheel face to wind to the desired extent, but will yield to admit of the wind wheel being swung around to a position nearly parallel with the tail vane, when the crank-plate wheel E will come in frictional contact with the brake and stop the wind wheel from revolving. When the wind subsides, or when the cord or chain with which the wind wheel is turned out of wind, is released, the spring lever H acts to bring the wheel back to wind, and it acts with greater tension or force at that point because it rests against the stop P, and is so constructed and attached that its tension is continually increased as the wind wheel swings around out of wind.

We have shown a weighted lever F, which is applied to the mill in the usual manner, which adds to the force of the spring in assisting to bring the wind wheel back to wind, as an auxiliary weighted lever acts in wind mills now in use. This we may or may not use, as we depend upon the spring brake lever to act to hold the wind wheel in wind, and it is so arranged that it acts with increased force as the wind wheel swings around out of wind.

The wooden brake-shoe is attached to the brake-shoe block in such a manner that it can be adjusted in proper position to strike full face against the edge of the crank-plate wheel, and can be readily removed when desired.

The slotted guide O holds the spring brake lever in position and prevents the frictional contact of the brake shoe with the crank-plate wheel from moving it vertically.

We have found that our spring brake lever serves the double purpose of carrying the brake and of holding the wind wheel to wind, and in many respects an improvement over any other wind mill now in use.

Having fully described the construction and operation of our invention, what we claim and desire to secure by Letters Patent, is:

1. In a solid wheel, hinged tail-vane wind mill, the turn-table carrying the wind wheel shaft and tail-vane; the tail-vane pivoted to the turn-table; the spring brake lever H having one end attached to the turn-table and the other end connected to the tail-vane, being lightly in tension when the wheel stands face to wind; a brake attached to the spring-lever and held by it to engage with the crank-wheel only when the wind wheel swings approximately parallel with the tail vane; and the crank-wheel with which the brake engages, the spring brake lever serving the double purpose of governing the wind wheel and carrying the brake, as specified.

2. The turn-table of a solid wheel wind mill; the spring brake lever H, attached to the turn-table; the brake-shoe block K and brake-shoe; the guide O attached to the turn-table and serving to guide the spring brake lever; the stop P serving to increase the tension of the spring; the crank-wheel or plate E; and the hinged tail-vane connected to the spring brake lever to apply the brake to the crank plate as the wheel swings out of wind.

JOHN H. MILLER.
WILLIAM H. BURNHAM.

Witnesses:
 A. D. MALLORY,
 FRED H. DOTY.